(12) United States Patent
Rauckman (10) Patent No.: US 6,878,883 B1
(45) Date of Patent: Apr. 12, 2005

(54) WILDLIFE GUARD FOR ELECTRICAL POWER DISTRIBUTION AND SUBSTATION FACILITIES

(76) Inventor: James Rauckman, 37 Ednick Dr., Swansea, IL (US) 62226

( * ) Notice: Subject to any disclaimer, the term of this patent is extended or adjusted under 35 U.S.C. 154(b) by 0 days.

(21) Appl. No.: 10/664,231

(22) Filed: Sep. 17, 2003

(51) Int. Cl.$^7$ .................................................. H01B 7/00
(52) U.S. Cl. ........................ 174/135; 174/5 R; 361/232; 52/101; 49/59
(58) Field of Search ........................... 174/139, 138 R, 174/135, 5 R, 137 R, 137 B, 40 R, 138 F, 167, 168, 151, 31 R, 142, 152 R, 140 CR, 158 F; 361/232; 52/101; 49/58, 59

(56) References Cited

U.S. PATENT DOCUMENTS

| | | |
|---|---|---|
| 1,766,636 A | 6/1930 | Holzel |
| 3,005,436 A | 10/1961 | Caldwell |
| 3,192,311 A | 6/1965 | Weinfurt |
| 3,410,936 A | 11/1968 | Juras |
| 4,053,707 A | 10/1977 | Ely et al. |
| 4,110,943 A | 9/1978 | Carlson |
| 4,201,883 A | 5/1980 | Shepherd |
| 4,359,844 A | 11/1982 | Hoggard et al. |
| 4,500,595 A | 2/1985 | Gerteisen et al. |
| 4,535,197 A | 8/1985 | Butler |
| 4,664,971 A | 5/1987 | Soens |
| 4,803,819 A | 2/1989 | Kelsey |
| 4,845,307 A | 7/1989 | Cumming et al. |
| 4,906,801 A | 3/1990 | Beasley |
| 5,293,721 A | 3/1994 | Richard et al. |
| 5,299,528 A | 4/1994 | Blankenship |
| 5,326,947 A | 7/1994 | Edds et al. |
| 5,446,242 A | 8/1995 | Barrett |
| 5,644,641 A | 7/1997 | Ikeda |
| 5,648,641 A | 7/1997 | Guthrie |
| 5,650,594 A | 7/1997 | Urnovitz |
| 5,679,922 A | 10/1997 | Harben |
| 5,682,015 A | 10/1997 | Harben |
| 5,794,495 A | 8/1998 | Anderson |
| 5,834,686 A | 11/1998 | Barrett et al. |
| 5,864,096 A | 1/1999 | Williams et al. |
| 5,873,324 A | 2/1999 | Kaddas et al. |
| 5,884,426 A | 3/1999 | Ishida |
| 6,005,196 A | 12/1999 | Spillyards |
| D432,742 S | 10/2000 | Puigcerver et al. |

(Continued)

OTHER PUBLICATIONS

Cooper Power Systems equipment brochure No. K–SEC 183, "Hi–Line Cover–Up Equipment" pp. 1–20, dated Mar. 1998.

(Continued)

*Primary Examiner*—Dean A. Reichard
*Assistant Examiner*—Angel R. Estrada
(74) *Attorney, Agent, or Firm*—Polster, Lieder, Woodruff & Lucchesi, L.C.

(57) ABSTRACT

The present disclosure provides a wildlife guard for electrical power equipment including a disc having a central opening for fitting onto the equipment. The disc includes an electrically insulating material with a conductive filler material in quantity sufficient for the disc to maintain an electrostatic charge. The disc has an insertion slot extending from an outer portion to the central opening for movement of the disc onto the equipment. The present disclosure also provides a wildlife guard for an electrical insulator bushing having an electrical conductor extending outwardly therefrom. The wildlife guard includes an electrically nonconductive cover for covering at least a portion of the electrical conductor, the cover being adapted to mount upon the bushing and a conductive panel attached to the cover.

19 Claims, 10 Drawing Sheets

U.S. PATENT DOCUMENTS

| | | |
|---|---|---|
| 6,248,956 B1 | 6/2001 | Cook et al. |
| 6,250,023 B1 | 6/2001 | Donoho |
| 6,255,597 B1 | 7/2001 | Bowling et al. |
| 6,291,774 B1 | 9/2001 | Williams |
| 6,314,914 B1 | 11/2001 | Betzen |
| 6,382,611 B1 | 5/2002 | Ramer |
| 6,453,775 B1 | 9/2002 | Dietric et al. |
| 6,571,517 B2 | 6/2003 | Wulff et al. |

OTHER PUBLICATIONS 3M corporation publicity release date–lined Austin, Texas—Apr. 16, 1998: "3M Electrostatic Animal Guard Humanely Keeps Animals Off Insulators & Bushings".

Hubbell/Chance Power Systems, Inc., catalog p. 2403 "Conductor and Insulator Covers" and p. 2408 "Crossarm Cover and Conductor and Insulator Covers" dated Jan. 2002.

Wall Street Journal article dated Feb. 4, 2003: "Fried Squirrel Fails to Find Favor With Public Utilities . . . as Electrocuted Critters Cause Power Outages".

Internet pages printed Sep. 11, 2003 from www.critterguard.org: "Reliability demands the only true barrier!" (5 sheets total, 2 of which are essentially blank).

3M brochure No. 78–8121–1101–7 © 1998: "Electrostatic Animal Guard (Formerly the Guthrie Guard)" (4 sheets total).

Page 325 (undated) of 3M Cable Accessory Products catalog: "Electrostatic Animal Guard".

Fig. 13

WILDLIFE GUARD FOR ELECTRICAL POWER DISTRIBUTION AND SUBSTATION FACILITIES

CROSS REFERENCE TO RELATED APPLICATIONS

None

FIELD OF THE INVENTION

The present invention relates to a wildlife guard for electrical power distribution and substation facilities. More particularly, it relates to a wildlife guard that is capable of maintaining a small electrostatic charge that provides an annoying shock to deter wildlife from climbing thereon.

BACKGROUND OF THE INVENTION

Distribution and substation equipment used to supply electrical power have used wildlife protection to prevent wildlife from simultaneously contacting energized and grounded surfaces or adjacent phases. When such contact occurs, short circuits and consequent power outages frequently are the result. The wildlife protection is typically applied to an equipment bushing or lightning arrester of the distribution or substation equipment. For adequate protection, a number of presently available wildlife guards have also required an insulated or covered wire between the bushing and arrester.

Available wildlife guards have posed problems because they only attempt to deter the animal from simultaneously touching a grounded surface and an energized surface. The guards do nothing to cause the animal from climbing on the equipment alone entirely. As a result, because the animal is not deterred from staying away from the equipment entirely, the animal may still find a way to simultaneously touch energized and grounded surfaces or may cause the wildlife guard to be move or removed from the protected device. Additionally, the animals, particularly squirrels, have a tendency to chew on prior art wildlife guards. As a result there is a need for a wildlife guard that prevents or deters animals from climbing upon energized equipment. Devices that provide an electrostatic shock to animals are known in the art. While these devices work for their intended purposes, they generally are categorized by a complex construction, non-desirable geometry and thus have a higher cost to produce.

The assignee of the present invention is the owner of U.S. Pat. No. 5,864,096 (the '096 patent), the entire disclosure of which is incorporate herein by reference. It has been found that an extremely useful and novel animal guard can be constructed in accordance with the '096 patent modified in accordance with the present invention. While the invention in one form is described in accordance with the '096 patent, those of ordinary skill in the art will recognize the wider applicability of the invention, including other forms of animal guards. The result is a lower cost, easier to install, more durable animal guard having wide applicability in the electrical utility field.

SUMMARY OF THE INVENTION

In one aspect the present invention provides a wildlife guard for electrical power equipment comprising a disc having a central opening for fitting onto the equipment. The disc comprises an electrically dielectric material with a conductive filler material in quantity sufficient for the disc to maintain an electrostatic charge. The disc has an insertion slot extending from an outer portion to the central opening for movement of the disc onto the equipment.

In a second aspect, the present invention provides a wildlife guard for an electrical insulator bushing having an electrical conductor extending outwardly therefrom. The wildlife guard comprises an electrically nonconductive cover for covering at least a portion of the electrical conductor, the cover being adapted to mount upon the bushing and a conductive panel attached to, or molded into the cover.

DESCRIPTION OF THE PREFERRED EMBODIMENT

While the invention is susceptible of embodiment in many different forms, there is described in detail preferred embodiments of the invention. It is to be understood that the present disclosure is to be considered only as an example of the principles of the invention. This disclosure is not intended to limit the broad aspect of the invention to the illustrated embodiments. The scope of protection should only be limited by the claims.

Figure 1:
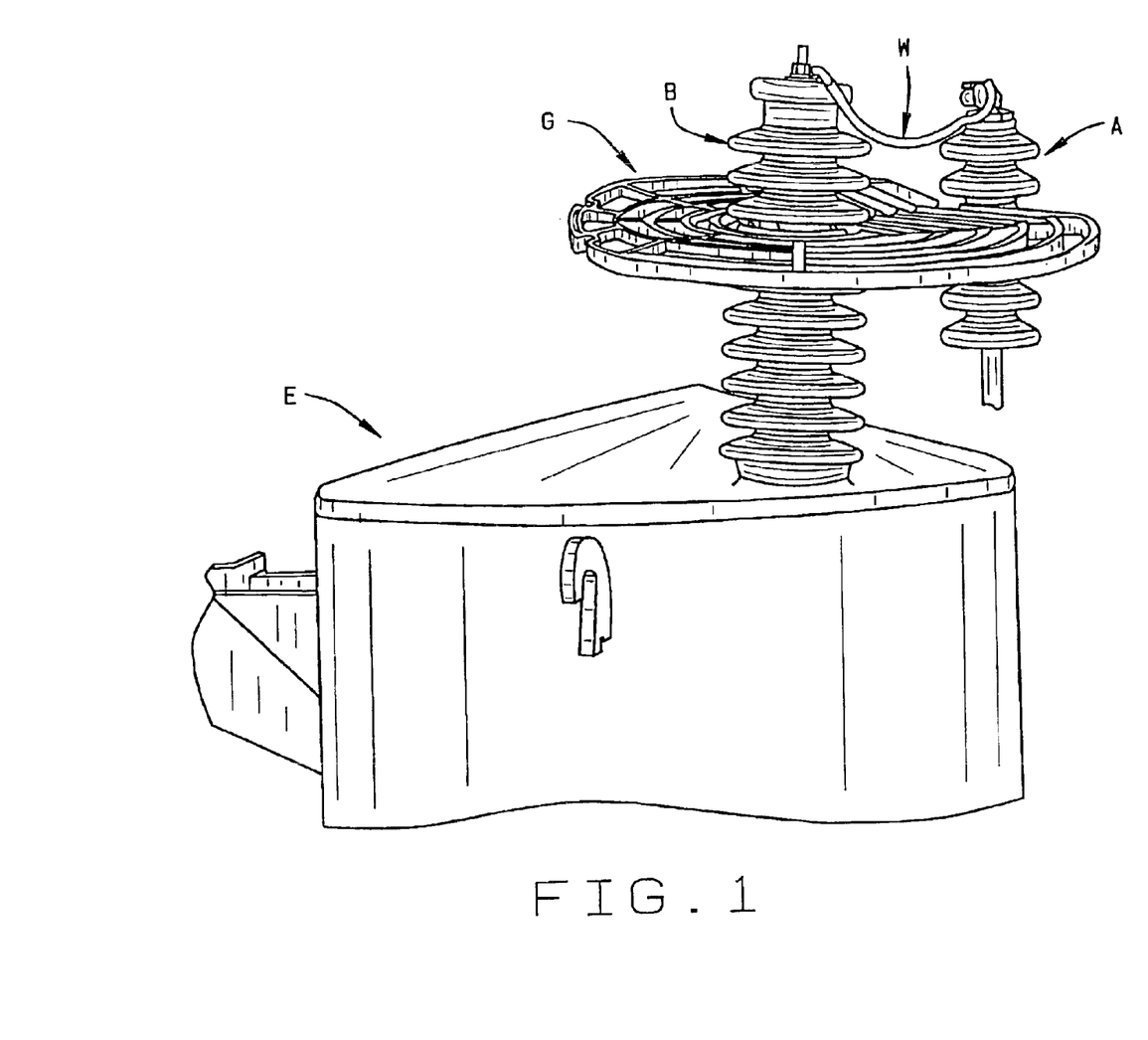
FIG. 1 is an isometric view of a wildlife guard according to the present invention mounted on electrical power distribution equipment.

In the drawings, the letter G designates generally a wildlife guard according to the present invention for installation on electrical power equipment for protection purposes. The guard G is shown in FIG. 1 installed on an insulative bushing B of electrical power equipment E. As will be set forth, the guard G prevents wildlife from coming into contact simultaneously with both an electrically energized portion of the equipment, such as a bushing terminal or a wire W connecting a bushing terminal to an arrester A, and an electrically grounded area or portion of such equipment or simultaneously contacting two electrical phases. In doing so, the guard G protects against short circuits and consequent power outages in an electrical power distribution network.

As can be seen in FIG. 1, the guard G is of a size to serve as an outwardly extending barrier so that an animal with one portion of its body, such as feet, paws, tails, etc., on an electrically grounded part of the power distribution network is unable to contact an electrically energized portion of electrical power distribution equipment, such as the wire W connecting bushing B and arrester A without first touching the inventions.

The bushing B is of the conventional type used in both substation applications and in distribution applications. Examples of distribution applications with bushings where the guard G may be used are on overhead transformers, on capacitors, on line arresters, on or near reclosers, regulators, terminators and the like. Examples of substation equipment with bushings where the guard G may be used include, for example, breakers, terminators, surge arresters and the like. It should be understood that the foregoing examples are given for illustrative purposes, and that other applications of the guard G are evident to those in the art.

Figure 2:
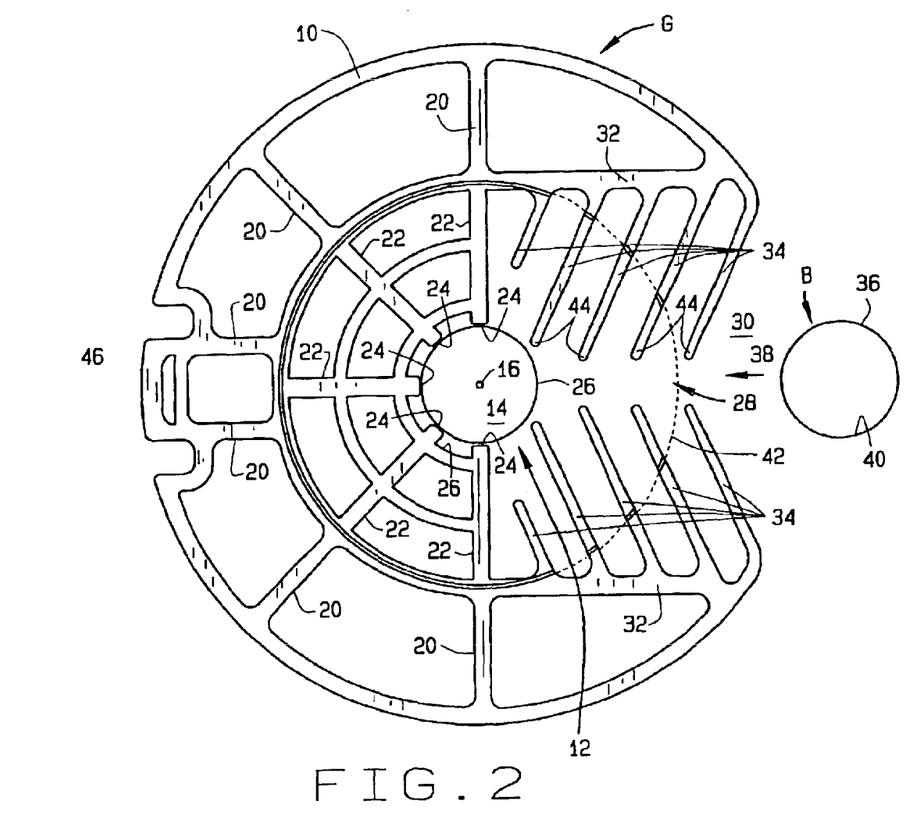
FIG. 2 is a plan view of the wildlife guard of FIG. 1.
Figure 3:
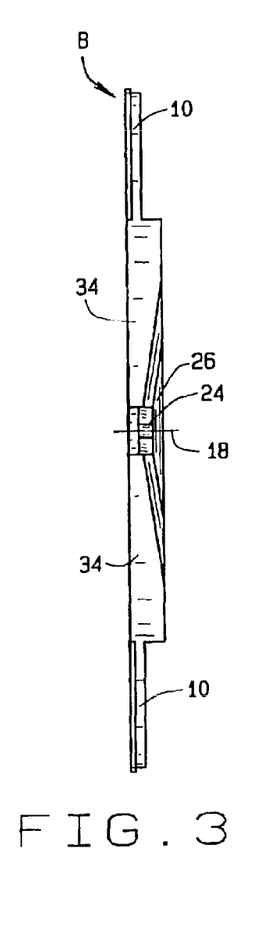
FIG. 3 is a side elevation view of the wildlife guard of FIGS. 1 and 2.
Figure 4:
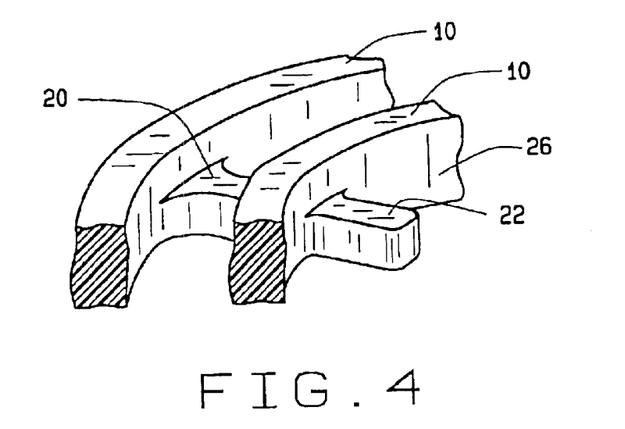
FIG. 4 is an enlarged isometric view of a portion of the wildlife guard of FIG. 2 circled and having reference numeral 4 designating same.
Figure 5:
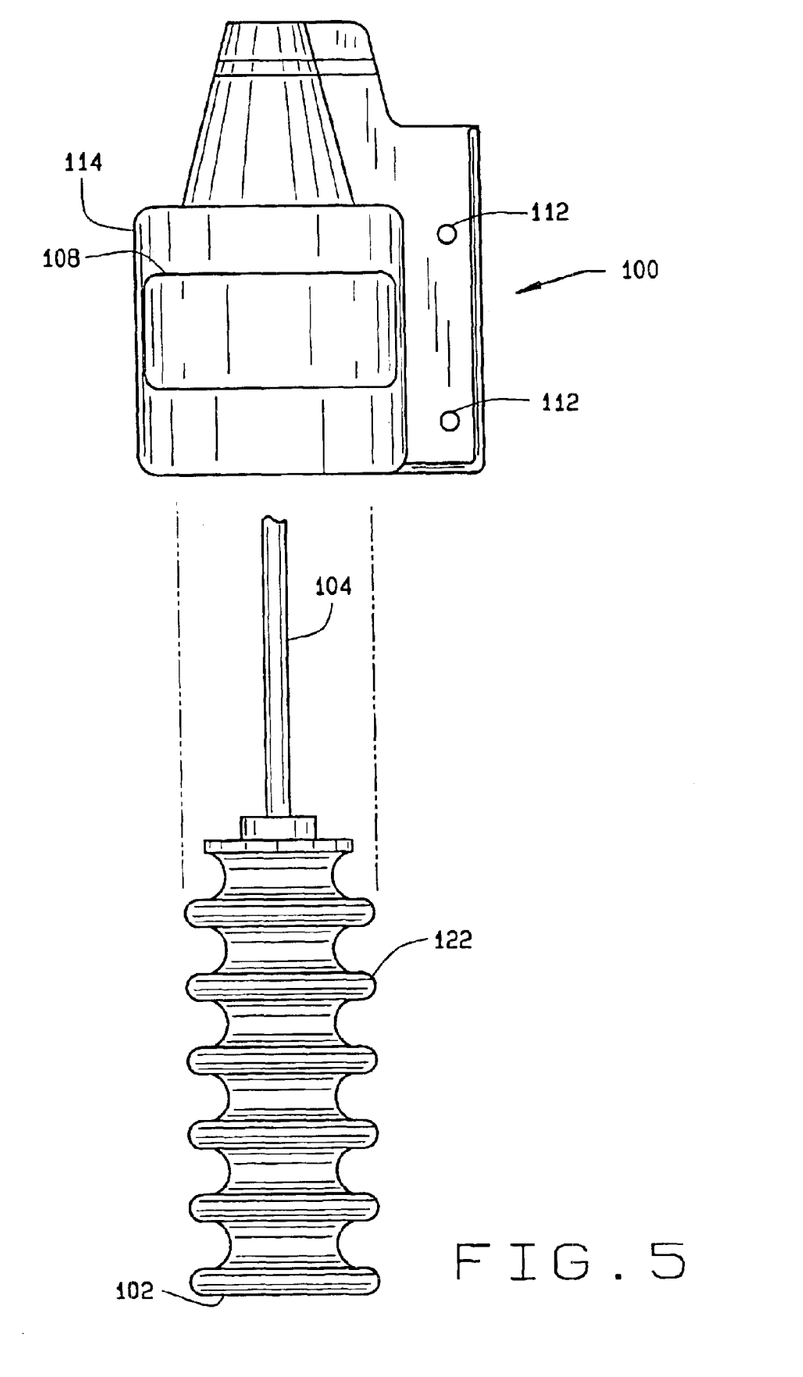
FIG. 5 is an isometric view of a wildlife guard attached to a insulating bushing.

Turning now to FIG. 2, the guard G is formed of a number of spaced, circular concentric ring members 10 of increasingly greater diameter disposed outwardly from a central section 12 which extends about a central inner opening or mounting slot area 14 about a central point 16. The rings 10 of the guard G are disposed outwardly from the central point 16 about the opening 14. The ring members 10 are typically about one-half inch in vertical height or thickness along a longitudinal axis 18 (FIG. 3) of the central point 16 of the central inner opening 14, but may be somewhat thicker, such as about five-eighths of an inch, except that the outermost ring is reduced in thickness to about one-fourth of an inch. The rings 10 are also each typically about one-quarter inch or so in width or circular thickness in diametric extent measured from the central point 16. The rings 10 are spaced from each other for reduction of weight and wind loading, and also to allow rain to periodically wash the bushing B or arrester A of debris or dirt.

Each of the spaced ring members 10 beyond the innermost three or so is connected to the adjacent ones of the concentric ring members 10 by a suitable number of radially extending spacer tabs 20 which are angularly separated from each other about the central point 16. The number and angular spacing of the tabs 20 is dependent on the desired degree of strength and load bearing capability of the guard G. In the embodiment shown, the tabs 20 are spaced at 45 degree radial intervals from each other with respect to the central inner opening 14. Transition surfaces between the tabs 20 and the rings 10 are generally curved or rounded for additional strength and ease of manufacture and molding. The tabs 20 are comparable in lateral width to the thickness of the rings 10, or about one-half to five-eighths of an inch, for example. In a preferred embodiment, the outer rings are thinner than the inner rings.

The innermost three of the ring members 10 are spaced from each other by inner tabs 22, which are generally of reduced height as compared to the rings 10. The reduced thickness inner tabs 22 are radially aligned with the tabs 20 and are typically about half as thick as the tabs 20. Further a set of inwardly extending lugs 24 are formed on an inner surface 26 of the innermost ring member 10. The lugs 24 are also radially aligned with tabs 20 and 22 and are of comparable thickness to the tabs 22. The inward extent of the lugs 24 defines the initial maximum insulator core diameter as indicated by a circle 26 of the bushing or object that can be fitted into the central opening 14. If desired, the guard G may be adapted for sizing purposes to fit onto larger diameter objects. This is done by cutting away the lugs 24 allowing removal of one or more of the inner ring members 10. The reduced thickness of inner tabs 22 facilitates this removal for sizing purposes.

The tabs 22 and lugs 24 are preferably of the same shape and of similar function. It is also typical for notches or reduced thickness connector portions to be formed in the tabs 22 at their inner ends where they connect with an inner ring 10. As described below, it is sometimes desirable to remove one or more of the inner rings 10 for sizing purposes. The notches or tabs 22 allow ease of removal of the inner rings 10 at their juncture with an inward end of the tabs 22. This permits the portion of the tab 22 remaining after removal of the ring 10 to function in a like manner to lugs 24.

The guard G has an insertion slot 28 formed extending radially inwardly from an outermost portion 30 adjacent the outermost ring 10 inwardly to the central opening or mounting slot 14. The insertion slot 28 serves as a passage or channel through which a portion of the electrical power equipment passes as the guard G is being mounted or installed.

The insertion slot 28 is formed between two generally parallel inwardly extending ribs or structural members 32 which extend from the outermost ring member 10 to the central opening 14. The guard G includes a plurality of angularly inwardly extending flexible teeth or fingers 34 formed on the rib members 32 on each side of the insertion slot 28. The insertion teeth 34 serve as insertion guides as the guard G is being installed or mounted onto electrical equipment. During such insertion, a portion of the bushing or equipment B, as indicated schematically at 36, is allowed to move inwardly, as indicated by an arrow 38, through the insertion slot 28 from the outermost ring member 10 to the central opening 14. The teeth 34 flex inwardly to allow passage of bushing B or arrester A during insertion of guard G. The flex of teeth 34 also serves to hold the guard G snugly to the bushing B or A.

The lugs 24 are provided to engage an outer surface 30 of the bushing B. As has been set forth, all or portions of the lugs 24, the inner rings 10 and the inner tabs 22 adjacent the central opening 14 out to a region indicated by line 42 may be removed. Removal is usually by cutting in order to allow snug fitting and engagement with the outside diameter 40 of the bushing or other electrical equipment on which the guard G is mounted.

The teeth 34 of the guard G adjacent the insertion slot 28 also serve as restraining members in the event of force being applied to attempt to move the guard G off the equipment, such as wind. Due to the angular inward extension of the teeth 34, outer end portions 44 of the teeth contact the outer surface 40 of the bushing or equipment and resist outward movement. If required, portions of teeth 34 within region 42 may also be removed to accommodate larger bushings B.

It is to be noted that the inwardly extending teeth or fingers 34 at their innermost portions 44 are spaced from each other a distance less than the outside diameter of the portion 40 of the bushing B or other equipment on which the guard G is to be mounted. This serves to provide an additional restraining force or function against outward movement of the guard member G off of the electrical equipment once it has been installed.

The guard G may comprise one or more installation grip areas 46 formed at suitable locations adjacent outer portions of the guard G.

It should also be understood that guards G of any suitable outside diameter may be used in accordance with installation requirements for electrical power distribution equipment.

The guard G can be seen to be a relatively thin, yet strong, easily stackable disc that is easily stored and does not occupy considerable storage space. Further, it is formed of a high-strength, durable synthetic resin that is resistant against deterioration from the sun's ultraviolet rays during service use. Most preferably, the material is UL94 compliant for low flammability and is formed by injection or compression molding. Moreover, the molded design does not invite the piercing of lineman's rubber gloves. The material of the guard G may be pigmented a suitable color for possible additional deterrent effects on certain animals or pigmented to visually blend with existing equipment to be less visually intrusive on the general public. It has been opined that the color red has deterrent effects on certain animals and the color gray is used on many other aerial devices such as transformers, insulators, bushings, etc. In the most preferred embodiment, the guard G is made from a plastic formulation mixed with a conductive filler material. It has been determined that the conductive filler distributed in the material forms an array of capacitors. The conductive filler material is preferably stainless steel conductive fibers, although it is anticipated that carbon black conductive material will also be a suitable material. Other conductive material is compatible with the broader aspects of the invention, such as copper, aluminum or any other material known to conduct electricity.

When stainless steel fibers are used, the stainless steel fibers preferably comprise less than about 20% by weight of the formulation, more preferably less than about 15% by weight of the composition, more preferably less than about 12% by weight of the composition, more preferably less than about 10% by weight of the composition, more preferably less than about 8% by weight of the composition, and most preferably between 3 and 5% of the composition. An important aspect of the present invention is that the guard G is a molded product. The conductive material is infused in or mixed with the primary material used to form the guard G.

The conductive material within the plastic formulation comprising the guard G is capable of attaining a small electrostatic charge from the electrostatic field surrounding, or adjacent to the electrically energized components of the device being protected. When touched by an animal, the charge dissipates to ground or across the device (e.g. a bird perched on the device) through the animal but is a small enough charge that the shock received by the animal serves only as a deterrent to climbing on the electrical device and does not injure the animal at all. It is believed that over time the shock will condition the animal to avoid the shock, and therefore the wildlife guard, completely. As a result, the conductive fibers within the guard G provide a deterrent to wildlife, preventing them from climbing on electrical equipment protected by the guard.

To install the guard G, an initial sizing measurement may be made, so that portions of the lugs 24, inner rings 10 and tabs 20 may be cut away as needed to ensure a proper, firm fitting engagement with the bushing B. The guard G, once properly sized, is moved so that the insertion slot 28 is aligned with bushing B. Production models are factory sized to the most popular equipment bushing sizes. The guard G may be installed on an energized (hot) electrical system, but electric power should be interrupted if a suitable insulated tool applied to installation grip or insulated gloves are not used. The teeth 34 serve as insertion guide, as noted above, and the guard G slides easily into firm engagement onto the portion 36 of the bushing B. When installed, the guard G serves as a deterring barrier so that wildlife do not come into simultaneous contact with both a live or electrified wire and an electrically grounded surface or area.

Additionally the embodiment of FIG. 2 can be used to prevent wildlife from walking along conductors by placing it over a nonconductive adapter placed over the conductor. Such conductors can include insulated wires, bare wires, solid bus or tubular bus. The adapter may have dielectric properties needed to create a difference in potential so that when installed on an engergized conductor, the invention maintains an electric charge that may be discharged through the unwanted animal.

Figures 7, 8, 9:
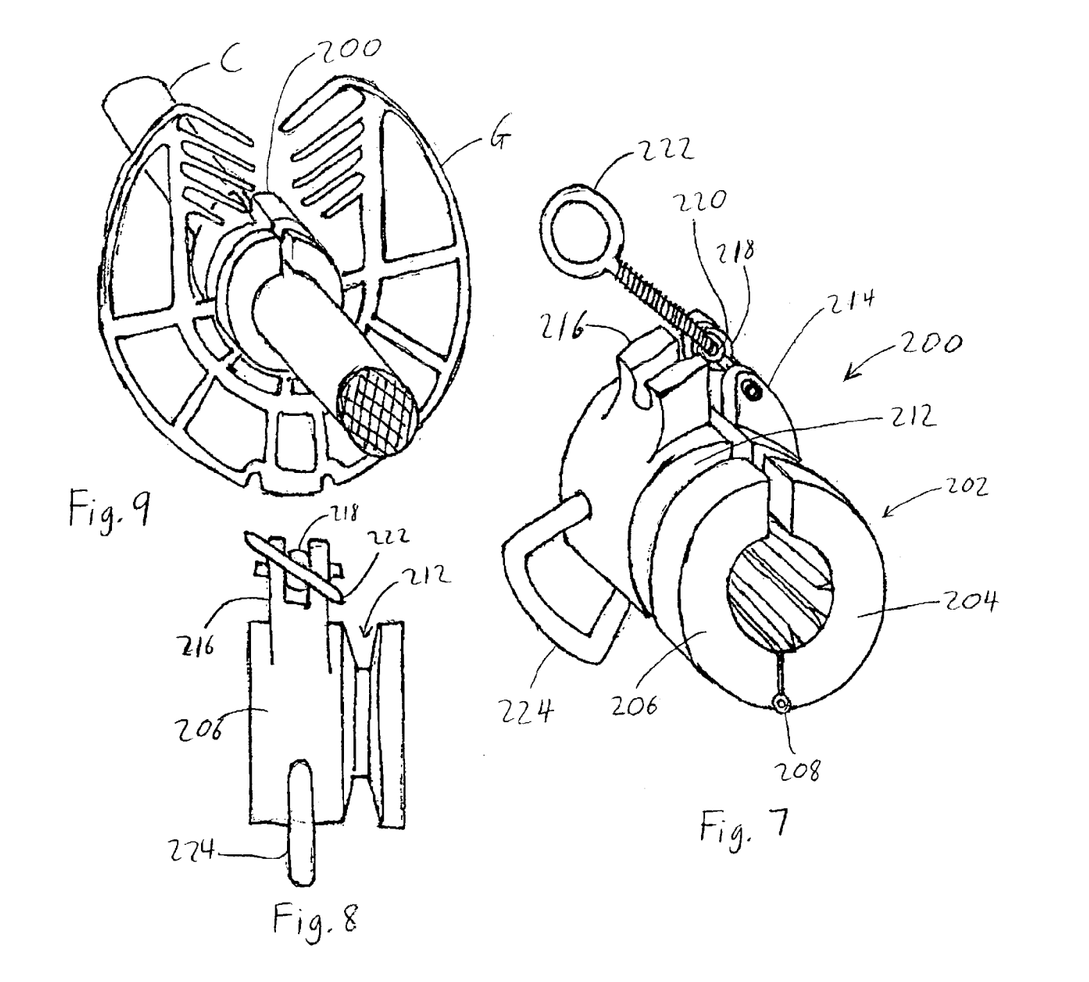
FIG. 7 is a perspective view of an adapter for a wildlife guard according to an embodiment of the present invention.
FIG. 8 is a side view of the adapter of FIG. 7.
FIG. 9 is a perspective view of the adapter of FIG. 7 installed upon a conductor with a wildlife guard installed thereupon.

Referring to FIGS. 7 and 8, an adapter 200 comprises a hollow cylinder 202 comprising a first half 204 and a second half 206 attached by a hinge 208. The interior of the hollow cylinder 202 has flexible fingers 210 located thereon, and the exterior of the cylinder 202 defines an annular groove 212. The exterior also comprises flanges 214, 216 on the first half 204 and the second half 206, respectively. The flange 214 is attached to a rod 218 having a threaded bore 220 therein. Threaded through the threaded rod 218, is an eye-bolt 222. The second flange 206 is adapted to engage the head of the eye-bolt 222 to clamp the adapter 200 onto a conductor running through the interior of the hollow cylinder 202.

The embodiment of FIGS. 7 and 8 may also include a hot stick attachment point 224 on the left half 206. Optionally the right half 204 may also include a hot stick attachment point. Referring to FIG. 9, the adapter 200 is attached to a conductor C by engaging the eye-bolt 222 with the flange 216 to clamp the adapter 200 onto the conductor C, as described above. Next, guard G installed within the annular groove 212 in the same manner as the guard is installed, for example, onto an insulator.

Figure 10:
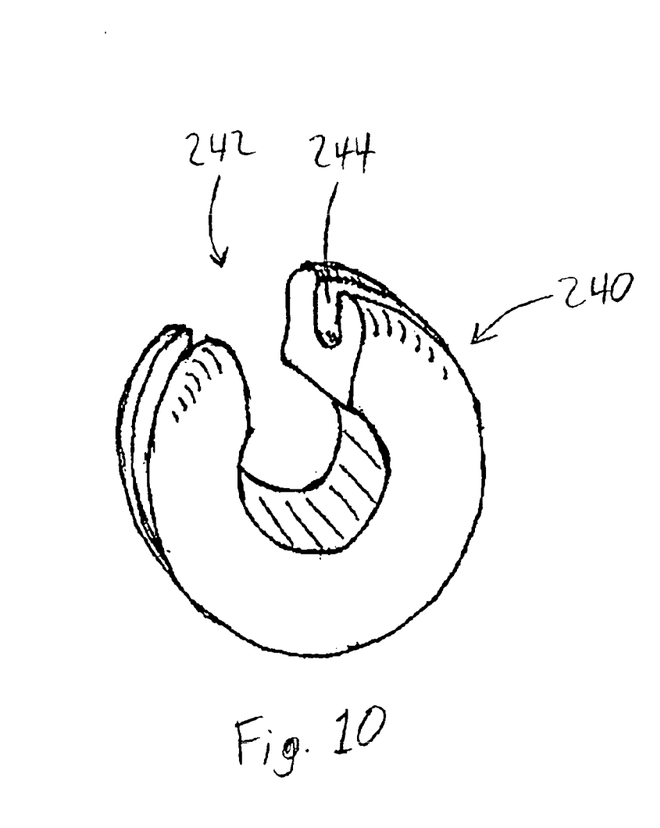
FIG. 10 is a perspective view of another embodiment of an adapter for a wildlife guard according to an embodiment of the present invention.
Figure 11:
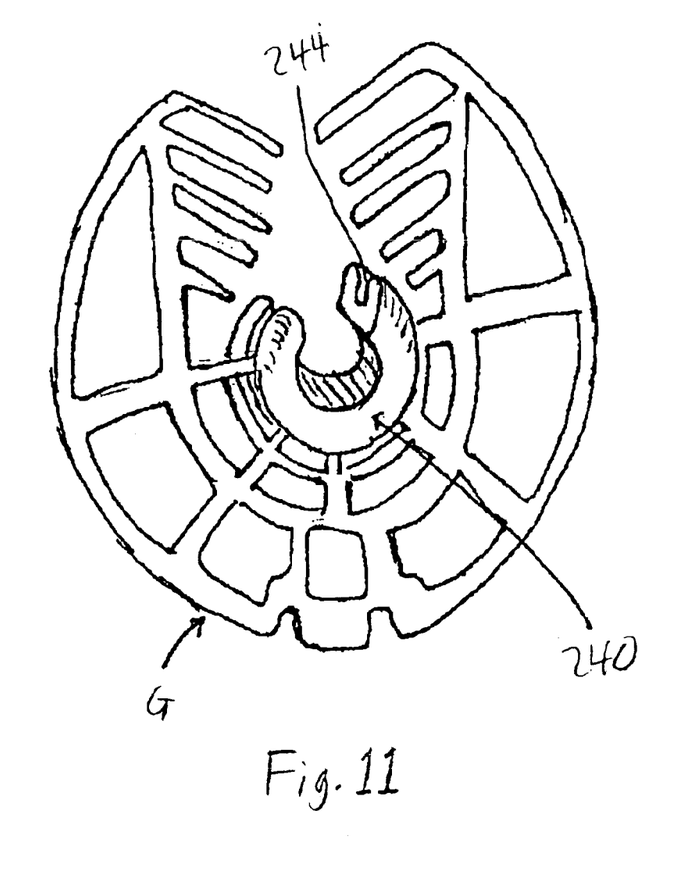
FIG. 11 is a perspective view of the adapter of FIG. 10 with a wildlife guard installed thereupon.

Referring to FIG. 10, an alternate embodiment of the adapter is adapter 240. The adapter 240 comprises a donut-shaped, flexible, nonconductive plastic portion defining a cutout section 242. The adapter 240 may be resiliently deformed to fit around a conductor. The adapter 240 further defines an annular groove 244 in an exterior portion thereof. Referring to FIG. 11, the guard G is installed onto the adapter 240 after the adapter 240 has been installed onto a conductor in the same manner as the embodiment of FIGS. 7–9.

Figure 6:
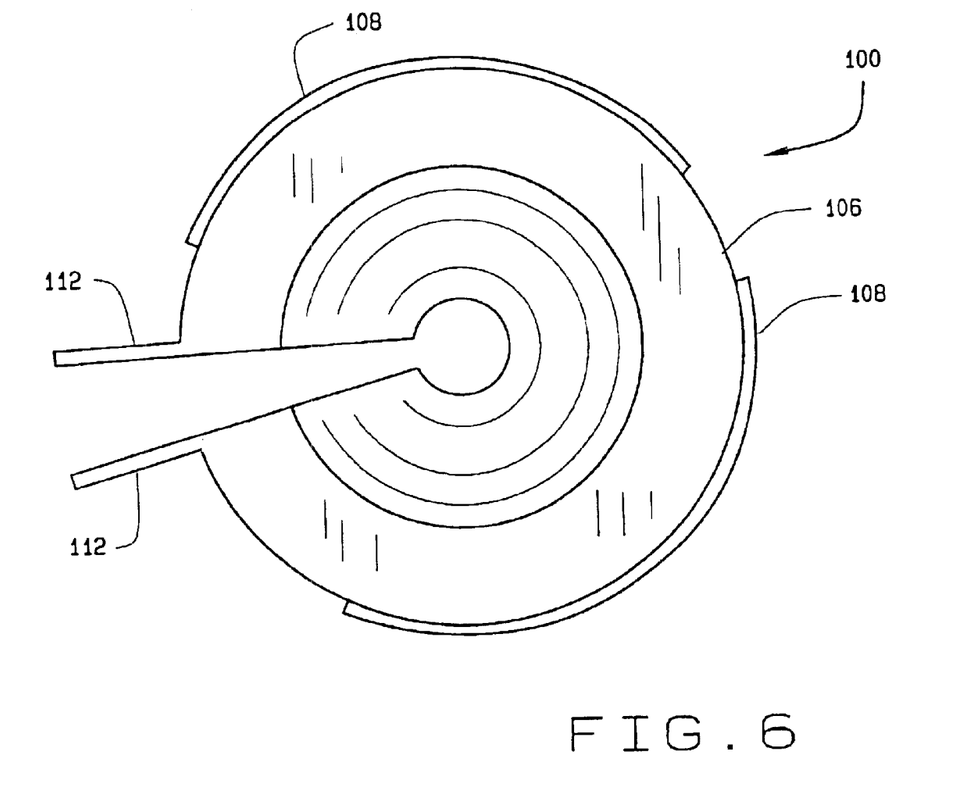
FIG. 6 is a bottom view of the wildlife guard of FIG. 5.

In another embodiment and referring to FIG. 6, there is provided a cover 100 for an electrical insulator bushing 102 having an electrical conductor 104 extending therefrom. The cover 100 comprises a jacket 106 and electrostatic panels 108 fastened to the cover 100. The jacket 106 defines a cylindrical body portion 114 and a frustoconically-shaped top portion leaving a circular opening at the top for entry of the conductor 104. The jacket 106 may also further define a bottom portion extending inwardly from the body portion 114. The jacket 106 also defines a pair of flanges 112 that can be separated by resiliently flexing the jacket 106. The flanges 112 may be attached to one another after the jacket 106 has been placed in service over the bushing 102 so as to maintain the cover 100 in position. While in position, an inwardly extending bottom portion of the jacket 106 is placed between radially outwardly extending skirts 122 of the bushing 102, as is known in the art.

Attached to the jacket 106, and most preferably the body portion 114, are electrostatic panels 108. The electrostatic panels 108 are made from a conductive polymer available from RTP Company under the trade name RTP-199 and retrofitted to an existing bushing cover by fasteners 110. However, the panel could equally be attached by means of adhesive, such as a glue or peel-off backing, or be in the form of a silicone tape material applied to the cover. The panels 108 could also be molded into the jacket 106. The panels 108 gain an electrostatic charge from electrostatic field transmitted through the air from the conductor 104. When an animal climbing on electrical equipment incorporating the cover 100 and comes into contact with one of the panels 108, the animal receives a small shock and is deterred from further climbing on the electrical equipment. The shock is not harmful to the animal, but is of a level that is an annoyance to the animal. It is believed that the receipt of the shock by the animal creates a conditioned response in the animal that further prevents the animal from climbing on the equipment. As a result, the present invention saves the cost associated power failures and avoids the unnecessary death of wildlife.

Figure 12A:
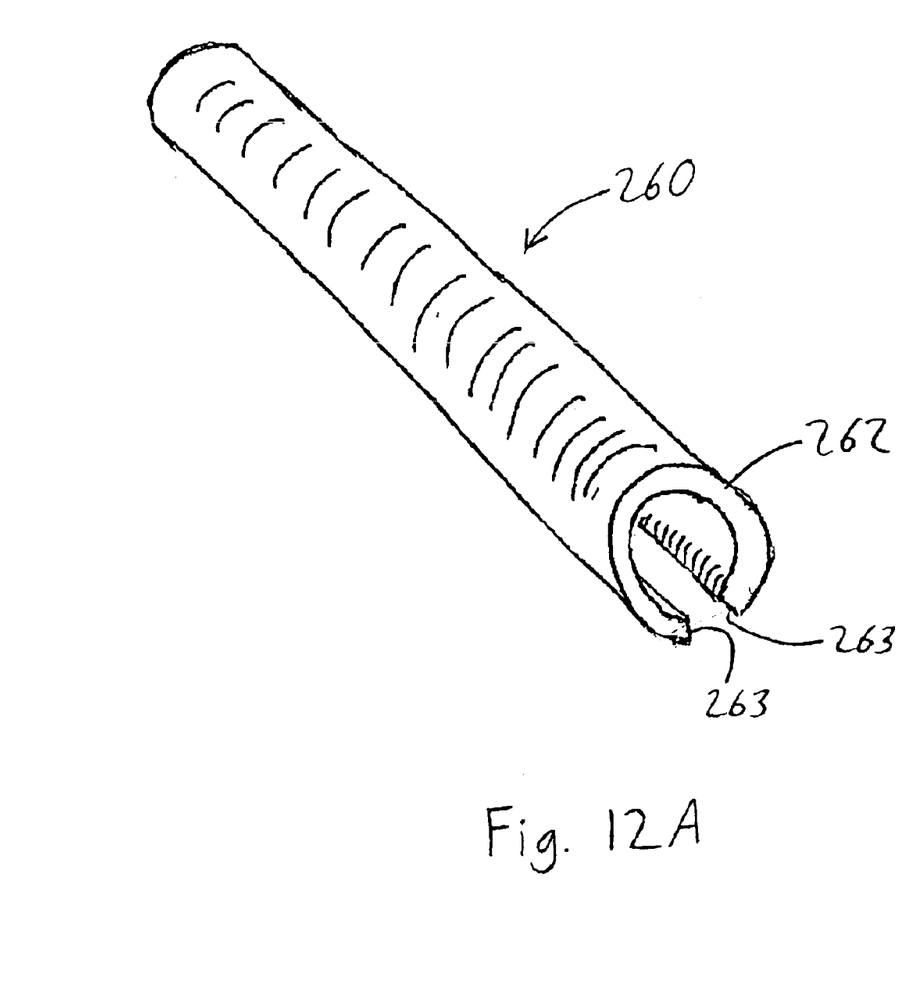
FIG. 12A is a perspective view of another embodiment of a wildlife guard according to an embodiment of the present invention.
Figure 12B:
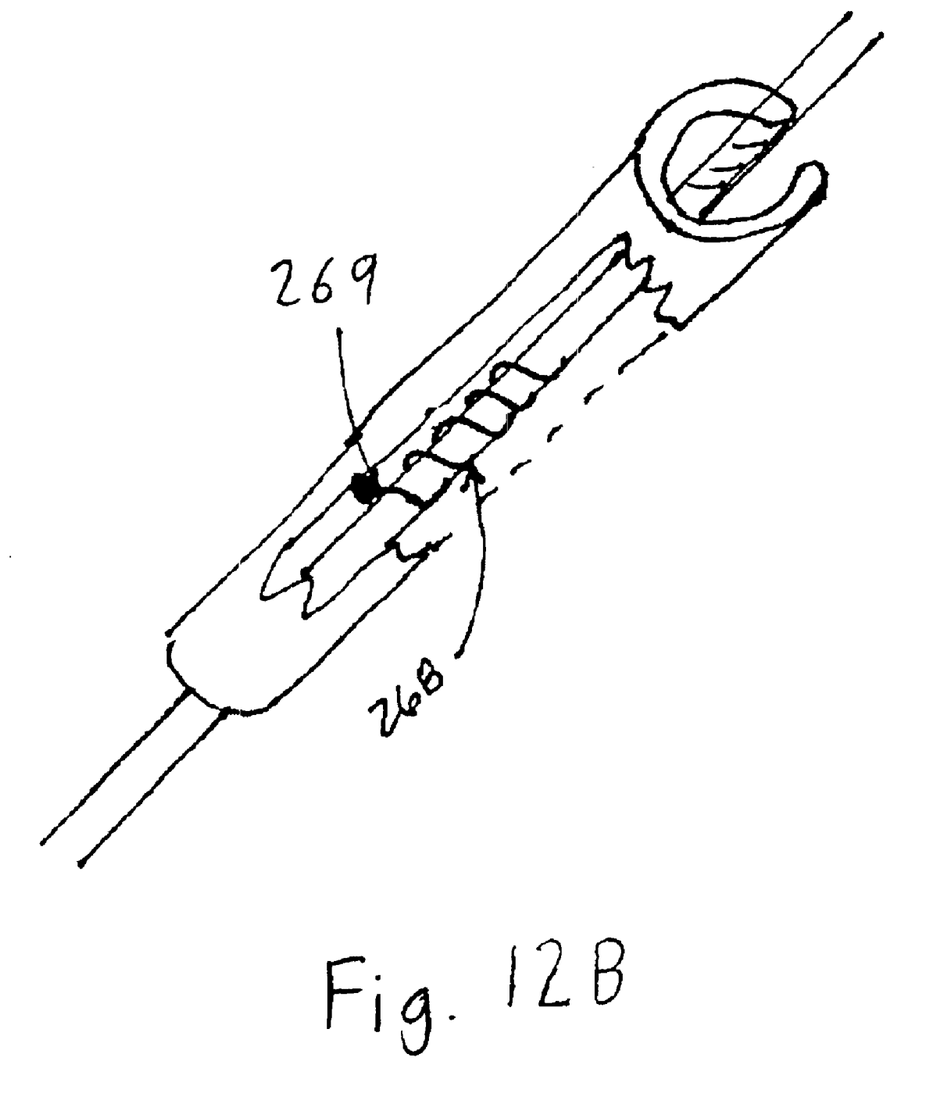
FIG. 12B is a plan view of a preformed wire grip according to an embodiment of the present invention.
Figure 13:
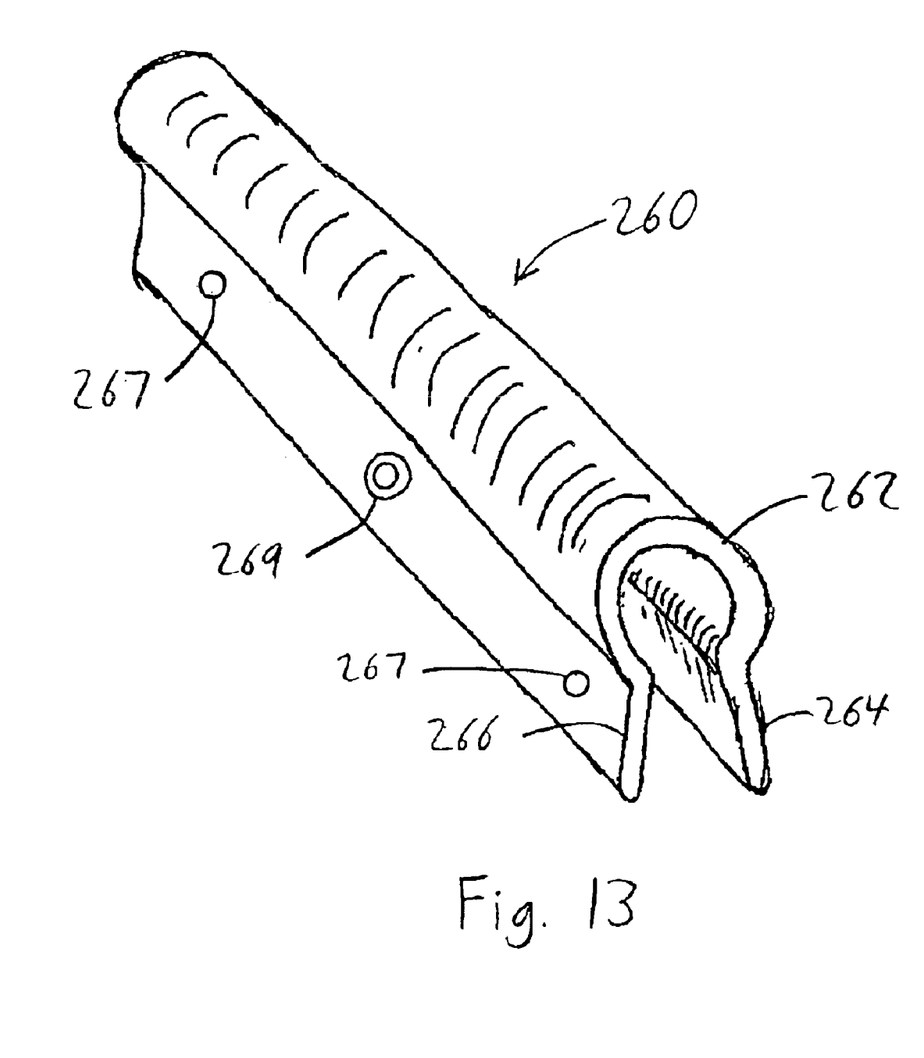
FIG. 13 is a perspective view of another embodiment of a wildlife guard according to an embodiment of the present invention.

Referring to FIG. 12A, another embodiment of the present invention comprises a wildlife guard 260 for placing upon an uninsulated conductor. The guard 260 comprises a hollow cylindrical portion 262 defining a longitudinal slit 263 and comprising end portions 263 that meet along the slit 263. The device 260 comprises an inner nonconductive layer and an outer conductive layer. The outer conductive layer preferably comprises a carbon black material or stainless steel fiber impregnated plastic, as described above. The end portions 263 may be resiliently separated to allow a conductor to be retained within the hollow cylindrical portion 262. The guard 260 may be attached by wrapping it with helically formed wire or helically formed synthetic resin grips 268 (FIG. 12B) having fasteners 269 attached thereto, as are well known in the art, or using adhesives or fasteners. In FIG. 13, a variation of FIG. 12A is shown having flanges 264, 266 attached thereto. The flanges 264, 266 define bores 267 therethrough through which fasteners 269 may be used to attach the flanges 264, 266 to one another.

Figure 14:
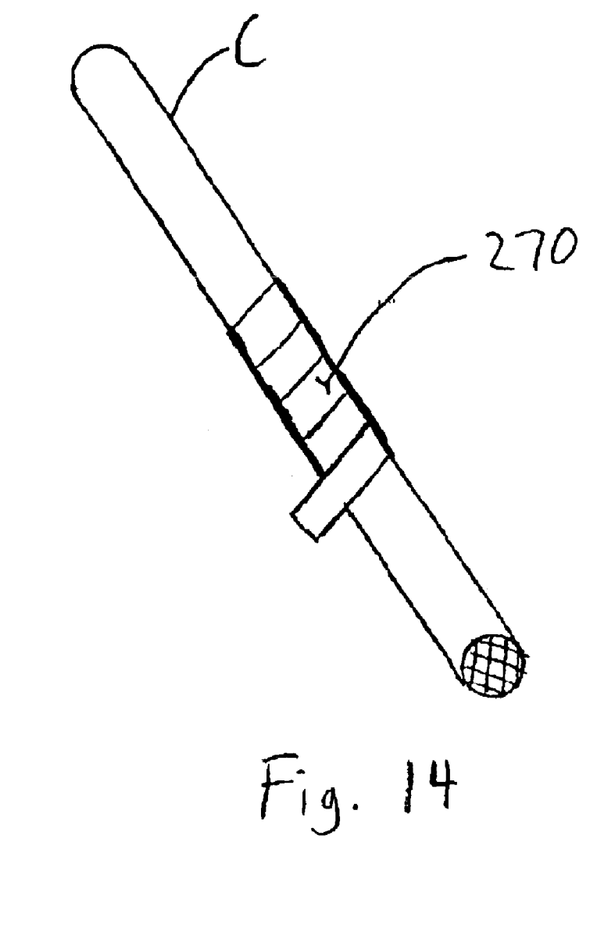
FIG. 14 is a perspective view of another embodiment of a wildlife guard according to an embodiment of the present invention.

Referring to FIG. 14, another embodiment of the present invention comprises a two layer tape 270 that may be applied, for example, to an uninsulated conductor C. The tape 270 comprises a first adhesive nonconductive layer and a second conductive layer and is applied to the conductor by wrapping it around the conductor. Most preferably, the two-layered tape 270 has bonding properties that allow it to adhere to itself forming a cylinder around the conductor.

It should be understood that the wildlife guards of the present invention apply to a wide variety, if not all, insulator materials. Further, although the alternative embodiments show the wildlife guards of the present invention for use in protecting bushings, arresters, insulators, and terminators, the present invention contemplates that other power devices having energized and grounded surfaces may also be protected from wildlife.

While the specific embodiments have been described, numerous modifications come to mind without significantly departing from the spirit of the invention, and the scope of protection should only limited by the scope of the accompanying claims.

What is claimed is:

1. A wildlife guard for electrical power equipment comprising:
    a disc having a central opening for fitting onto the equipment comprising:
        an electrically insulating material; and
        a conductive filler material dispersed within the electrically insulating material in quantity sufficient for the disc to maintain an electrostatic charge;
    the disc having an insertion slot extending from an outer portion to the central opening for movement of the disc onto the equipment.

2. The wildlife guard of claim 1 wherein the disc comprises:
    a plurality of ring members concentrically located about the central opening; and
    spacer ring tab members mounted between the ring members for connecting the ring members.

3. The wildlife guard of claim 2 further including a plurality of lug members extending inwardly into the central opening from an inner one of the ring members for engaging an outer surface of the equipment.

4. The wildlife guard of claim 2 wherein the ring members are of increasing diameter extending in concentric location from an innermost ring member adjacent the central opening to an outermost ring member.

5. The wildlife guard of claim 2 wherein inner ones of the ring members are removable from the tab members.

6. The wildlife guard of claim 5 wherein the tab members adjacent the inner ones of the ring members function as engaging lugs on removal of the inner ones of the ring members.

7. The wildlife guard of claim 1 further including guide notches formed in the disc adjacent an installation grip for engagement with the an installation tool.

8. The wildlife guard of claim 1 further comprising a plurality of teeth formed along the insertion slot engaging the equipment and holding the disc in place on the equipment.

9. The wildlife guard of claim 8 wherein the teeth face inwardly along side portion of the insertion slot to allow ease of movement of the disc onto the equipment.

10. The wildlife guard of claim 8 wherein portions of the teeth are removable to adapt the disc for various sizes of electrical power distribution equipment.

11. The wildlife guard of claim 1 wherein the disc comprises a barrier between an energized surface and a grounded surface or between any two electrodes of different electrical potential.

12. The wildlife guard of claim 1 wherein the conductive material comprises carbon black.

13. The wildlife guard of claim 1 wherein the conductive material comprises stainless steel fibers.

14. The wildlife guard of claim 1 further comprising a nonconductive adapter placed over a conductor onto which the wildlife guard is mounted.

15. The wildlife guard of claim 14 wherein the adapter comprises a hollow cylinder comprising two halves attached by a hinge and clamped onto the conductor with a clamp, the adapter having an annular groove in an exterior portion thereof for maintaining the wildlife guard upon the adapter.

16. The wildlife guard of claim 14 wherein the adapter comprises a donut shaped resilient material having a cutout section removed therefrom and adapted to be resiliently deformed to fit around the conductor, the adapter further defining an annular groove in an exterior portion thereof for maintaining the wildlife guard upon the adapter.

17. The wildlife guard of claim 1 further comprising
at least one installation grip area for engagement with a gripping portion of an installation tool, the installation grip area comprising:
a plate member for engagement with the gripping portion of the installation tool; and
a passage port adjacent to the plate member for passage of the gripping portion of the installation tool.

18. A wildlife guard for electrical power equipment comprising a disc having a central opening for fitting onto the equipment comprising:
an electrically insulating material;
a conductive filler material dispersed within the electrically insulating material in quantity sufficient for the disc to maintain an electrostatic charge;
a nonconductive adapter placed over a conductor onto which the wildlife guard is mounted, said adapter comprising a hollow cylinder comprising two halves attached by a hinge and clamped onto the conductor with a clamp, the adapter having an annular groove in an exterior portion thereof for maintaining the wildlife guard upon the adapter;
the disc having a insertion slot extending from an outer portion to the central opening for movement of the disc onto the adapter.

19. A wildlife guard for electrical power equipment comprising a disc having a central opening for fiting onto the equipment comprising:
an electrically insulating material;
a conductive filler material dispersed within the electrically insulating material in quantity sufficient for the disc to maintain an electrostatic charge;
a nonconductive adapter placed over a conductor onto which the wildlife guard is mounted, said adapter comprising a donut shaped resilient material having a cutout section removed therefrom and adapted to be resiliently deformed to fit around the conductor, the adapter further defining an annular groove in an exterior portion thereof for maintaining the wildlife guard upon the adapter;
the disc having a insertion slot extending from an outer portion to the central opening for movement of the disc onto the adapter.

* * * * *